June 22, 1965 W. A. BEDFORD, JR 3,190,996
PRECISION FORMED METAL BARS HAVING HARDENED BEARING PORTIONS
Filed May 2, 1963 5 Sheets-Sheet 1

INVENTOR.
WILLIAM A. BEDFORD, JR.
BY
ATTORNEY

June 22, 1965 W. A. BEDFORD, JR 3,190,996
PRECISION FORMED METAL BARS HAVING HARDENED BEARING PORTIONS
Filed May 2, 1963 5 Sheets-Sheet 3
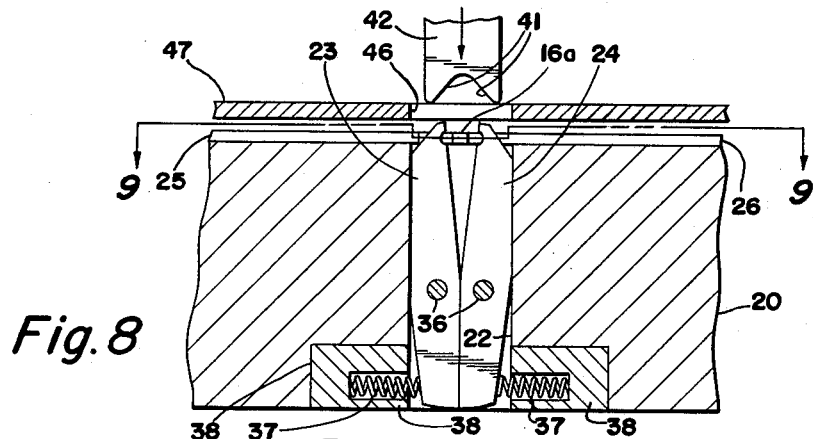
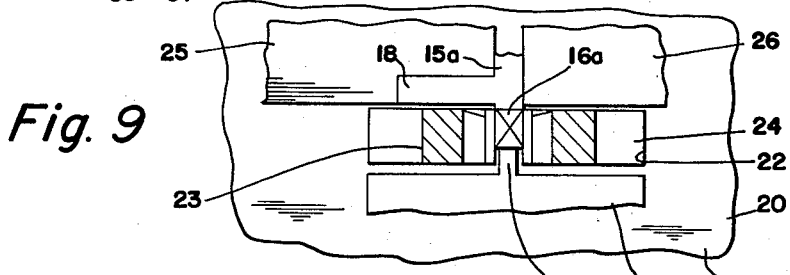
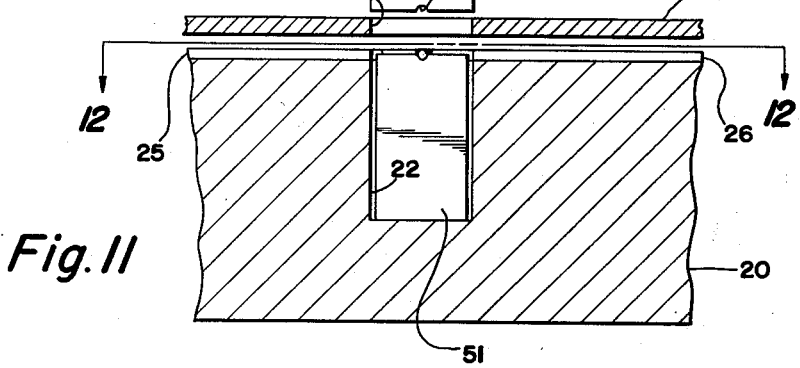
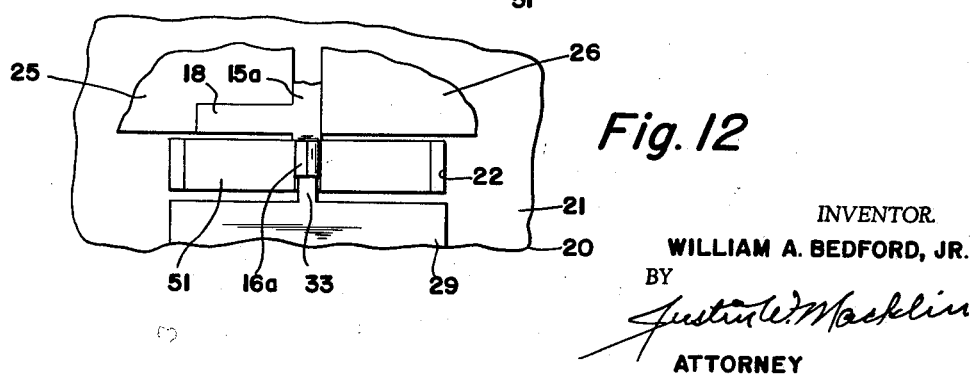
INVENTOR.
WILLIAM A. BEDFORD, JR.
BY
ATTORNEY

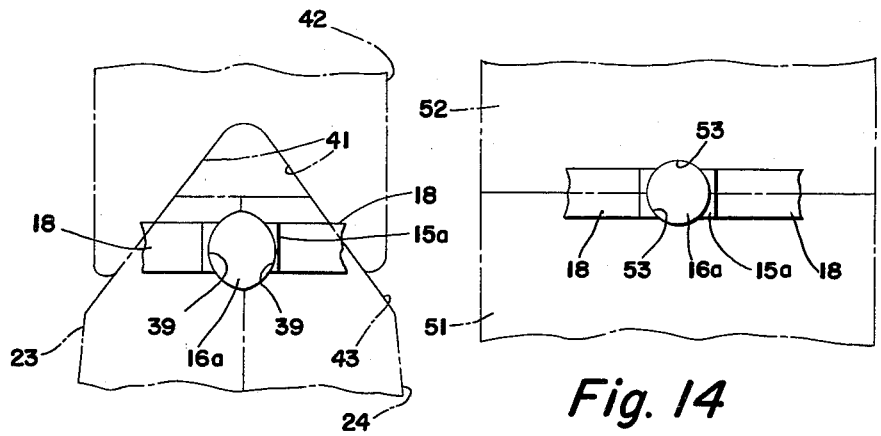
Fig. 13
Fig. 14
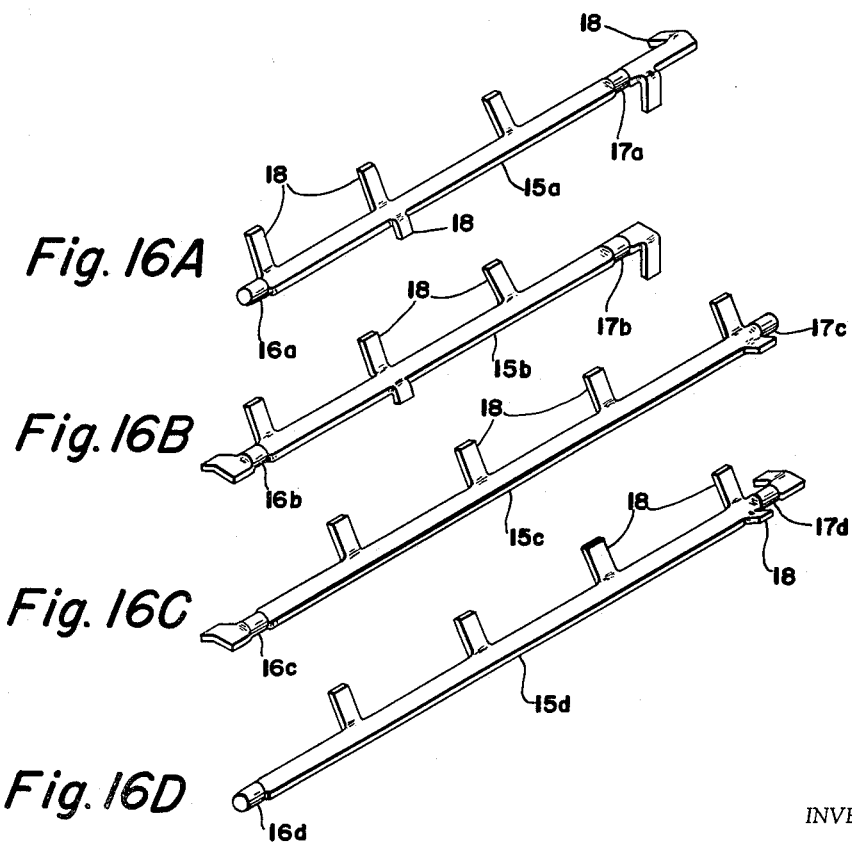
Fig. 16A
Fig. 16B
Fig. 16C
Fig. 16D
INVENTOR.
WILLIAM A. BEDFORD, JR.
BY
ATTORNEY United States Patent Office 3,190,996
Patented June 22, 1965

3,190,996
PRECISION FORMED METAL BARS HAVING HARDENED BEARING PORTIONS
William A. Bedford, Jr., Littleton, Colo., assignor, by mesne assignments, to Republic Industrial Corporation, New York, N.Y., a corporation of Delaware
Filed May 2, 1963, Ser. No. 277,611
5 Claims. (Cl. 200—166)

The present invention relates to specialized metal parts, as exemplified by cranks or switching bars employed in automatic pushbutton telephones.

In the manufacture of the latest form of telephones and telephone "dialing systems," the dialing mechanism is replaced by a pushbutton system. Connecting the actual pushbuttons with the miniaturized switches within the telephone are a plurality of cranks or switching bars, each of which is provided with a number of finger-like members projecting in several directions for actuating the various switches. These cranks or switching bars are journaled in bearing mountings and are required to oscillate or pivot into and out of contact with both the pushbutton and miniaturized switches. Because of the miniaturization of telephone facilities, the switching bars must be relatively small. Nevertheless, they must also be formed and dimensioned with a high degree of accuracy so as to operate properly over a long period of time, the structural form and dimensions of the bars being extremely critical. Particularly, the bearing surfaces must be perfectly round so that the bars will rotate freely without vibration. Also, the bearing surfaces must be relatively hard so as not to wear at an excessive rate.

It is an object of the present invention to provide such switching bars and other parts with accurately controlled structure, shape, and dimensions. It is another object of this invention to provide switching bars which are stamped from common, relatively soft, sheet stock material and which have formed bearing surfaces of the required hardness. Still another object is to provide for the inexpensive mass production of such switching bars.

One of the problems in fabricating metal articles of the type referred to is that accurate forming of certain parts of the articles may require that the metal be in a soft and malleable condition during the forming operations, whereas other portions of the articles, such as the bearing surfaces mentioned above, may require a much harder metal in those portions of the finished article. While this does not necessarily pose any technical problems where the cost of production is a less critical consideration, it poses difficult technical problems where the permissible production costs will permit using only the simplest and fastest manufacturing operations.

In the case of the telephone switching bars described above, it is desirable to form the articles in finished condition from sheet stock in a progressive blanking and forming die assembly as the stock is fed stepwise through a punch press having an automatic roll feed. Production cost limitations make it important, if possible, for the articles to be in finished condition when they are discharged from the stamping machine, so that no additional manufacturing operations and costs are required.

Accomplishing the results last described involves coping with several problems at one time, namely—

(1) Bending the finger-like extensions at accurately and uniformly controlled relative angles in a stamping machine is difficult unless the metal stock is very soft and malleable so that it has a minimum tendency to spring back from the form to which it is bent.

(2) The bearing surfaces to be formed on the switching bar bodies must have hard, wear resistant surfaces; and, in order to provide such surfaces on very soft and malleable material, either heat treating or rather severe cold working of the metal is required.

(3) Heat treating involves a substantial additional cost to be avoided if possible; and severe cold working normally causes extensive dimensional changes and warping of adjacent thin metal sections, which effects are commonly too variable in character and degree to be predictable and compensated for in the dimensions of the sheet metal stock and dies employed in producing the article.

(4) Normal variations in the properties of the sheet metal stock from one lot to another and even from one zone to another in a single roll of sheet stock further complicate problem number 3 above.

By the present invention, the foregoing problems are overcome or so greatly minimized that a variety of articles heretofore difficult to manufacture can be produced with an exceptionally high degree of control of shape and dimensions. This is achieved in a manner that is readily applied to the operation of progressive blanking and forming die assemblies in a punch press having an automatic roll feed so as to form the articles from ordinary, soft and malleable, sheet stock in a single pass of the stock through the machine.

In general, the invention is applicable with the greatest benefits to articles that require the bending and/or drawing of blanked out portions of the article and, also, the formation of hard surfaced shapes by cold forging or coining other blanked out portions of the article, while also requiring very accurate final shapes and/or dimensions for the finished article. As the invention is applied to the above mentioned switching bars, in which the cross-sectional configuration of the body of the bar (except for the bearings thereon) and the cross-sectional configuration of the finger-like members may both be rectangular or of any other desired shape the articles may be readily made by the method of the invention while accurately controlling all of the critical dimensions and configurations. The resulting articles are novel when fashioned in this manner and have proven to be satisfactory in structure and cost of manufacture for the exacting demands of the dialing mechanisms of pushbutton telephones.

The switching bars of this invention may be produced by a method that is characterized by a series of steps that may be most efficiently performed as a continuous operation on soft, malleable, sheet stock in a conventional type of punch press, as noted above, the machine being equipped with suitable progressive blanking and forming dies and automatic roll feed for performing a series of fabricating steps as the sheet progresses through the machine. In the broadest aspect of the method, these steps include:

(a) Blanking out from the sheet at least that portion of the article to be forged, or coined;

(b) Cold forging that portion of the article to finished form while confining the metal of the article against warping and distortion and the forged zone against extrusion during the forging operation, whereby the forged metal portion is confined while being work hardened and finish formed and without disturbing the shape or dimensions of contiguous unforged portions, and (c) In a separate step or steps, blanking out any remaining portions of the article and finish forming them.

When the foregoing steps are followed as stated, the entire portion of the sheet being fabricated and of the article being formed therefrom may be held accurately against unwanted changes in dimensions during the forging step; and the forging step will serve to work harden the forged portion only of the article. The remainder of the article may be accurately blanked out and bent and/or drawn to finished form with a high degree of accuracy from the soft and malleable stock, as will be appreciated by those skilled in the art.

The foregoing and additional objects, features and advantages of the invention will become apparent from the following detailed description of the method as applied to the manufacture of the novel switching bars, and from the accompanying drawings.

In the drawings—

FIGURES 1A, 1B, 1C, and 1D are plan views, substantially to scale, of flat switching bar blanks as they would be formed if punched from sheet stock in a single step prior to forming bearings thereon and prior to bending any of the finger-like members as required in the finished articles, the locations of bearings to be formed on the bars being indicated in each of the four views;

FIGS. 2, 3, 4, 5, and 6 are greatly enlarged transverse sectional views of the blanks of FIGS. 1A, 1B, 1C, and 1D after the finger-like members have been bent to their proper orientations relative to the body of each bar, each sectional view being taken from two or more of the blanks of FIGS. 1A, 1B, 1C, and 1D as indicated by the lines 2—2, 3—3, 4—4, 5—5, and 6—6 thereon;

FIG. 8 is an enlarged, vertical sectional view of the apparatus and bar blank of FIG. 7, also showing an actuator for one of the pairs of preliminary forging dies of FIG. 7 and a conventional stripper plate, the actuator and stripper plate being conventionally mounted on the vertically reciprocable punch holding head (not shown) of the press;

FIG. 9 is a fragmentary, further enlarged, horizontal sectional view of the apparatus and bar blank of FIGS. 7 and 8, the view being taken through the upper ends of one of the pairs of preliminary forging dies as indicated by the line 9—9 in FIG. 8;

FIG. 11 is an enlarged, vertical sectional view of the apparatus and bar blank of FIG. 10, also showing an upper finish forging die for cooperating with one of the lower finish forging dies of FIG. 10 and a conventional stripper plate, the upper forging die and stripping plate being conventionally mounted on the vertically reciprocable punch holding head (not shown) of the press;

FIG. 12 is a fragmenatry, further enlarged, plan view of the apparatus and bar blank of FIGS. 10 and 11, the view being taken as indicated by the line 12—12 in FIG. 11;

FIG. 13 is an end elevation, on a still further enlarged scale, of the end bearing stock of the switching bar blank of FIG. 1A as the bearing is shaped to partially finished form by one of the pairs of dies and its actuator in the apparatus of FIGS. 7—9, the pair of dies and actuator being shown, in phantom outline, in closed condition at the end of the working stroke of the press;

FIG. 14 is a similarly enlarged, end elevation of the end bearing stock of the switching bar blank of FIG. 1A as the bearing is finish formed by upper and lower forging dies in the apparatus of FIGS. 10–12, the dies being shown, in phantom outline, in closed condition at the end of the working stroke of the press;

Figures 1A, 1B, 1C, 1D:
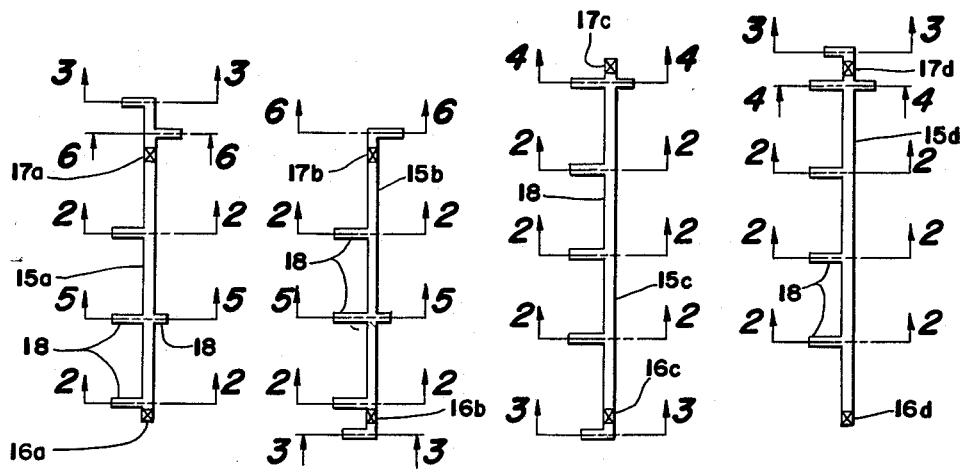
Figure 2:
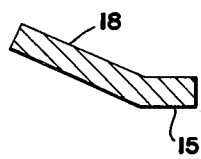
Figure 3:
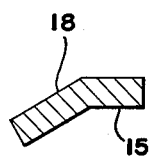
Figure 4:
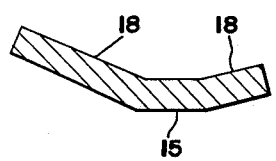
Figure 5:
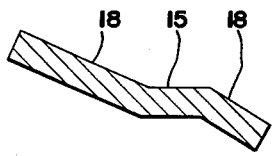
Figure 6:
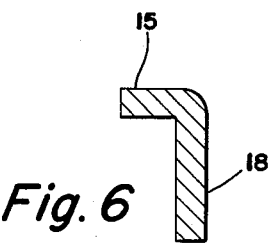
Figure 7:
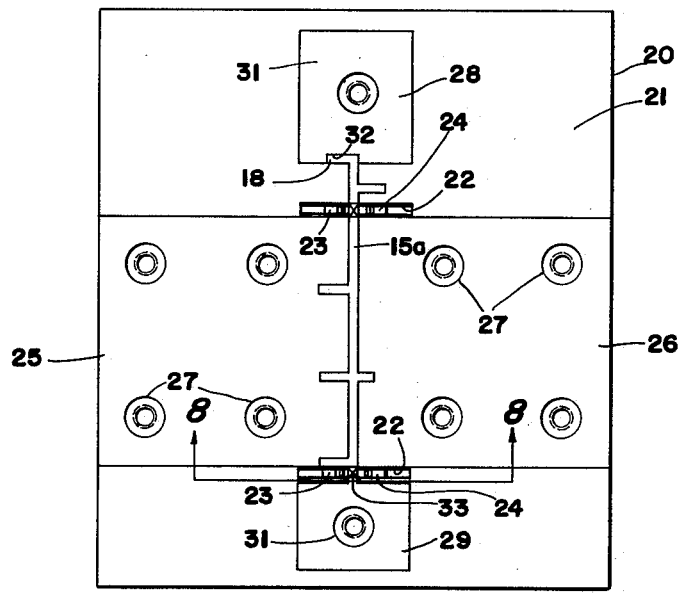
FIG. 7 is a plan view of a lower die block and an arrangement of preliminary forging dies and restraining plates holding the bar blank of FIG. 1A, by way of example, in position on the bed of a simple punch press for forging bearings to a partially finished form at the two required locations on this blank.
Figure 17:
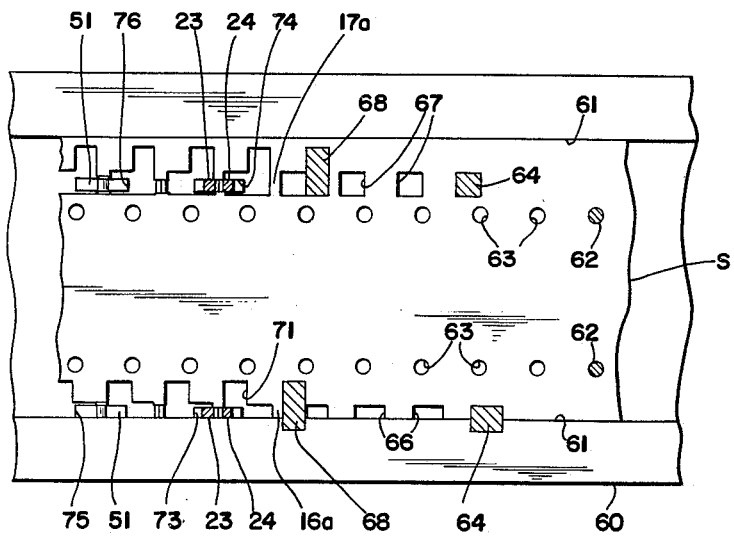

FIGS. 16A, 16B, 16C, and 16D are perspective views of the four kinds of finished switching bars that are respectively formed from the blanks of FIGS. 1A, 1B, 1C, and 1D; and FIG. 17 is a fragmentary plan view of an illustrative die block and progressive blanking and forming die assembly of a punch press having an automatic roll feed for forming, in a sequence of successive steps, the switching bar of FIG. 16A, by way of example, the sheet stock being shown in the machine as it is progressively formed at each working station and showing in horizontal section some of the upper punches (which cooperate with lower dies mounted in the die block but not shown) positioned for progressively defining the outline of the bearing portions of the bar blank of FIG. 1A.

Referring first to FIGS. 16A, 16B, 16C, and 16D, four different forms of generally similar switching bars 11, 12, 13, and 14 are shown on an enlarged scale to illustrate the finished articles that constitute the product of the present invention. Although, as a matter of economics, these particular articles would preferably be produced in a punch press equipped with an automatic roll feed for continuously passing sheet stock from the roll through a progressive blanking and forming die assembly in the machine, these articles may also be formed by utilizing simple, conventional, punch presses and transferring an initially formed blank from one such punch press to another for performing the successive fabricating steps. Accordingly, the method of producing these articles in accordance with the present invention, in the interest of greater simplicity of disclosure, will first be described as it would be carried out in this latter manner.

Referring now to FIGS. 1A, 1B, 1C, and 1D, four different blanks are shown as each would first be punched out in a single punching step in a simple punch press from soft and malleable sheet stock, such as substantially fully annealed brass, for further forming operations to produce the articles of FIGS. 16A, 16B, 16C, and 16D. Each such blank would consist of an elongated bar body, such as 15a in FIG. 1A, the bar body being of rectangular cross section. Locations on the bar body 15a which are to be subsequently forged or coined into cylindrical bearings are indicated at 16a and 17a. Spaced along the length of the bar body 15a are coplanar, finger-like members that are all designated by the reference character 18, for simplicity, although they are not all of the same length as is apparent from the drawings. Other corresponding parts of the blanks of FIGS. 1B, 1C, and 1D are designated by corresponding reference numerals having the alphabetical suffixes b, c, and d, respectively.

The succeeding forming operations that are performed on the blanks of FIGS. 1A, 1B, 1C, and 1D preferably involve first forging the cylindrical bearings at the locations designated thereon and then bending the various finger-like members 18 so that they extend in desired radial directions relative to the longitudinal axes of the respective bars 15a, 15b, 15c, and 15d. Illustrative orientations of the finished fingers relative to all of bar bodies 15a, 15b, 15c, and 15d are shown in FIGS. 2–6, these figures being sectional views through the finished switching bars at locations along the length thereof indicated by the correspondingly numbered section lines applied to the blanks of FIGS. 1A, 1B, 1C, and 1D.

Continuing the description of the method of the present invention as applied to the subseqeunt operations performed on the blank of FIG. 1A to produce the finished switching bar of FIG. 16A, this blank may be transferred from the punch press on which it is formed to a die block and associated die assembly mounted on the same or another punch press for preforming the bearings of the switching bar. The die block and forming die assembly suitable for this purpose is illustrated in FIGS. 7, 8, 9 and 13. It includes a die block 20 having a flat upper surface 21, except for two rectangularly shaped vertical apertures 22 that extend vertically therethrough for respectively accommodating two pairs of complementary, oppositely disposed, pivotally mounted dies 23 and 24. Each pair of dies 23 and 24 is adapted to oscillate, with a plier-like action, into and out of engagement during each operating cycle of the press for preforming the bearings of the switching bar as hereinafter described.

A pair of oppositely disposed nest plates 25 and 26 are disposed in spaced apart relationship on the die block surface 21 and are held immovably in place thereon by a plurality of bolts at the locations designated 27. The adjacent edges of the nest plates 25 and 26 are configured to conform to the outline of opposite sides of the switching bar blank between the bearing locations 16a and 17a thereon for engaging and holding this part of the blank against lateral distortion during the bearing performing operation of the dies 23 and 24. The nest plates are very slightly thinner than the stock of the blank of FIG. 1A.

At opposite ends of the switching bar blank as it is positioned on the die block 20, a pair of back-up plates 28 and 29 are secured to the surface 21 of the die block by bolts at the locations designated 31. The back-up plate 28 is recessed along one edge 32 to receive the end finger 18 of the bar blank for holding this end of the blank against distortion during the bearing performing operation. The back-up plate 29 is provided along one edge with a projecting boss 33 that extends into engagement with the end of the bar blank at the bearing location 16a for holding the metal in the bearing zones of the bar blank against axial extrusion during the bearing preforming operation. The back-up plate 28 at the opposite end of the blank also performs a similar function in preventing axial extrusion in the bearing zones. As will be apparent, the two back-up plates cooperate to prevent any lengthening of the blank as the bearing portions are subjected to preforming deformation between the pairs of dies 23 and 24. Like the nest plates 25 and 26, the back-up plates 28 and 29 are very slightly thinner than the blank of FIG. 1A, and the boss 33 is narrow enough to be received with slight lateral clearance between the jaw recess of the pair of bearing preforming dies 23 and 24 when these dies are closed about the end bearing stock at the location 16a on this blank.

Referring particularly to FIGS. 8, 9, and 13, the two pairs of dies 23 and 24 are pivotally mounted in their apertures 22 in the die block on a pair of pins 36, and the dies are urged about their respective pins by pairs of springs 37 held by insert blocks 38 to maintain the jaws at the upper ends of the dies separated as shown. The jaws of each pair of dies are oppositely recessed at 39 (FIG. 13) so that, when the jaws are forced together against the action of the springs 37, the opposed recesses 39 define a generally ellipsoidal cavity opening horizontally at its opposite ends. This cavity is slightly longer than the end bearing to be preformed at the blank location 16a so as to receive the end portion of the boss 33 on the back-up plate 29. The other pair of dies 23 and 24 for preforming the bearing at the blank location 17a defines a cavity conforming in length to the bearing stock to be deformed.

Closure of the jaws on each pair of dies 23 and 24 is effected by a cam action of the opposite walls 41 of a V-shaped notch formed in the lower extremity of an aligned actuating tool 42. These walls 41 of the notch in the actuating tool sloped to engage and slide into flat surface-to-surface contact with opposite outer walls 43 of the associated pair of dies while forcing the die jaws together about a bearing-forming portion of a switching bar. The actuating tools 42 for the two pairs of dies are conventionally mounted on the vertically reciprocable punch holding head (not shown) of the press. They are aligned with apertures 46 in a stripper plate 47 that is conventionally mounted on the punch holding head of the press with a spring loaded, lost motion connection. Descent of the head of the press first lowers the stripper plate into engagement with the bar blank so as to assist in holding the blank in place and then lowers the actuating tools 42 forcibly into engagement with the upper cam surfaces 43 of the respectively associated pairs of dies 23 and 24 so as to close each pair of dies forcibly together about the bearing-forming portion of the blank disposed between the jaws of that pair of dies. As shown in FIG. 8, the bearing-forming portions of the bar blank are initially of rectangular cross section, and, as shown in FIG. 13, they are forged into an ellipsoidal shape defined by the die recesses 39.

During the above-described forging operation, the boss 33 of the back-up plate 29 and the cooperating back-up plate 28 at the opposite end of the bar blank (FIG. 7) cooperate to maintain the longitudinal dimension of the blank as explained above. The nest plates 25 and 26 and the back-up plate 28 restrain lateral distortion of the bar blank.

After the above-described preforming of the two bearings of the bar blank at the locations 16a and 17a, the blank may be transferred from the punch press in which the bearing preforming operation has been performed to a generally similar die block and associated die assembly mounted on the same or another punch press for finish forming the bearings on the blank. The die block and forming die assembly suitable for this purpose are illustrated in FIGS. 10–12 and 14 and include the same or another die block 20, pair of nest plates 25 and 26, and pair of back-up plates 28 and 29, as previously described. A lower finish forming die 51 is mounted in each recess 22 of the die block, and complementary, upper finish forming dies 52 are mounted in the head of the press for downward movement through the apertures 46 in the stripper plate 47 and into die closing engagement with the lower dies 51, respectively. The opposed, complementary end surfaces of each pair of dies 51 and 52 are oppositely recessed at 53 (FIG. 14) to define a truly cylindrical cavity therebetween when the die sets are closed about the bearing forming portions of the bar blank. This finish forms the final bearings on the blank. As before, during the bearing preforming operation, the back-up plates 28 and 29 maintain the longitudinal dimension of the blank against any elongation as the bearing portions are subjected to finish forming deformation between the sets of dies 51 and 52. Also, as before, the nest plates 25 and 26 and the back-up plate 28 restrain lateral distortion of the bar blank.

By carefully and precisely dimensioning the punches which define the bearing stock portions at the blank locations 16a and 17a, and by machining the coacting parts of the preforming and finish forming die sets with the same care and accuracy, the two bearings may be similarly and simultaneously preformed on each blank, as described with reference to FIGS. 7–9 and 13, and finish formed on each blank, as described with reference to FIGS. 10–12 and 14, with the required precision and uniformity. In this connection, a particularly critical factor is the amount of bearing stock provided in the bearing forming portions 16a and 17a of the bar blank during the blanking out step. This amount of stock must be such as to completely fill but not overfill the ellipsoidal die cavity defined by the recesses 39 in the preforming punches 23 and 24 as the bearing stock is severely worked in deforming it into this preformed configuration.

The blank of FIG. 1D is handled precisely the same as the blank of FIG. 1A in forming the two bearings thereon, only obvious dimensional and configuration changes being required. The blanks of FIGS. 1B and 1C are also similarly handled during the bearing forming operations except that the back-up plate 29 is replaced by one having an end finger receiving recess like the back-up plate 28.

Figure 10:
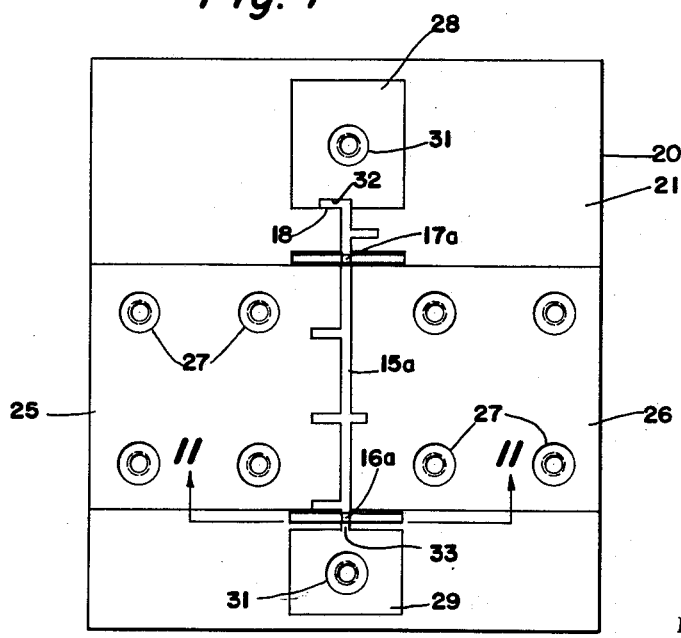
FIG. 10 is a plan view, similar to FIG. 7, of a lower die block and an arrangement of finish forming dies and restraining plates holding the bar blank of FIG. 1A in position on the bed of a simple punch press for finish forming the two bearings on the bar blank.
Figure 15:
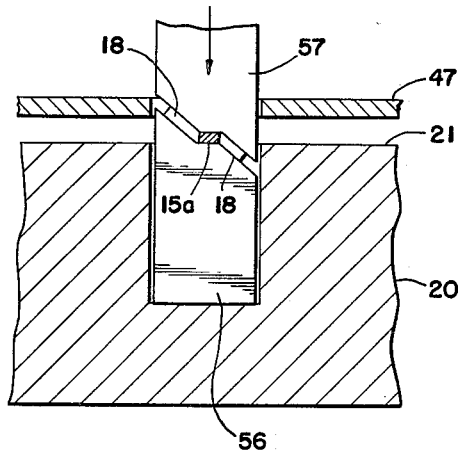
FIG. 15 is a fragmentary, vertical sectional view, generally similar to FIGS. 8 and 11, showing the same kind of punch press carrying upper and lower dies that cooperate to bend two of the finger-like members of a bar blank to their proper finished orientation relative to the bar body as shown in FIG. 5, by way of example.

Referring now to FIG. 15, the apparatus shown is generally similar to that of FIGS. 10–12 except for omission of the nest plates 25 and 26 and back-up plates 28 and 29, and the substitution of pairs of complementary finger bending dies, such as the illustrated dies 56 and 57, in place of the finish forging dies 51 and 52. A set of such finger bending dies is provided for each finger of the bar blank that requires orientation to project out of coplanar alignment with the body of the blank, the several sets of dies being aligned and spaced along the length of the bar blank as required by the finger locations on the blank, and each die set having working face configurations as required to produce the appropriate one of the cross-sectional configurations shown in FIGS. 2–6. In place of the nest plates and back-up plates 25, 26, 28, and 29, suitably configured blank positioning plates (not shown) may be similarly mounted on the die block 20 to position the blank thereon while providing clearance for the sets of bending dies, as will be understood by those skilled in the art.

Either by using separate punch presses or by changing die block and die assemblies on a single press, any of the switching bars of FIGS. 16A, 16B, 16C, and 16D may be processed by the method of the present invention to preform bearings thereon with the apparatus setup of FIGS. 7–9 and 13, to finish form the bearings with the apparatus set up of FIGS. 10–12 and 14, and to bend and orient the switching bar fingers 18 in the apparatus of FIG. 15, all with the required degree of accuracy in producing switching bars of the desired configurations and final dimensions, and with the advantages mentioned above herein.

Referring now to the continuous production of the switching bars of the invention from continuous sheet stock fed in a stepwise manner through a progressive blanking and forming die block and die assembly on a punch press equipped with automatic roll feed, FIG. 17 illustrates one die block and die assembly arrangement suitable for this purpose, the other components of the machine being conventional and requiring no detailed illustration or description. The die block 60 to be mounted on the bed of the press has an upper surface that is recessed to provide a longitudinally extending channel through which a strip of sheet stock S is fed from a roll. This channel has a depth only very slightly less than the thickness of the strip S and a width, as defined by opposite channel side walls 61, such that the channel side walls engage opposite edges of the strip with a close sliding fit. The width of the strip S is precisely that of the finished length of the particular form of switching bar to be blanked and formed from the strip during its passage through the machine.

In order to properly register the strip S at each working station along its path as it is fed stepwise through the press, the vertically reciprocable punch holding head (not shown) of the press carries a pair of transversely spaced, cylindrical punches 62 which, on each working stroke of the press, punch a pair of registration or pilot holes 63 in laterally spaced parts of the strip which serve as connecting webs between successive blanks as they are progressively formed and until severing of the finished switching bars at the discharge end of the die block. Appropriate dies (not shown) are mounted in the die block 60 in vertical alignment with the punches 62 for coaction therewith in a conventional manner during punching of the pilot holes 63. The location of the punches 62 may be considered as a first working station along the path of travel of the strip S.

At a second working station along the path of travel of the strip S, a pair of square punches 64 are mounted similarly to the pilot hole punches 62 for coaction with mating dies (not shown) in the die block 60. The punches 64 notch one edge of the strip S at 66 and remove square areas of metal at the locations 67 adjacent, but spaced from, the opposite edge of the strip.

At a third working station, a pair of rectangular punches 68 are mounted similarly to the pilot holding punches 62 for coaction with mating dies (not shown) in the die block 60. The punches 68 remove additional material at the locations 71 and 72, respectively, whereby the zones 16a and 17a of the blank of FIG. 1A, for example, are defined with sufficient stock being removed to permit access to the bearing forming zones by the necessary forging dies referred to below.

At a fourth working station, the die block 60 is apertured at laterally aligned locations 73 and 74 to respectively receive pairs of the same plier-like dies 23 and 24 described with reference to FIGS. 7–9 and 14. Coacting actuating tools (not shown) identical with the tool 42 (FIGS. 8 and 13) are respectively mounted on the vertically reciprocable punch holding head for actuating the pairs of plier-like dies in the manner previously described.

At a fifth working station, the die block 60 is apertured at laterally aligned locations 75 and 76 to respectively receive lower finish forming dies 51 identical with those described with reference to FIGS. 10–12 and 14. Coacting, complementary, upper, finish forming dies (not shown) are mounted in the head of the press in alignment respectively, with the lower dies 51 for finish forming the bearings at the locations 16a and 17a in the manner previously described.

At succeeding working stations along the path of travel of the strip S, but omitted from the drawings for simplicity, are additional stock removing punches mounted in the head of the press and cooperating dies mounted in the die block 60 for stepwise removal of additional material from the strip until the entire bar blank has been blanked out except for laterally spaced zones of the strip containing the pilot holes 63 and constituting the connecting webs between the successive blanks, as previously mentioned.

At a further succeeding station, sets of upper and lower bending dies (not shown) are similarly mounted in the head of the press and the die block 60, respectively, for coaction in the manner illustrated in FIG. 15 and described above to bend and orient the several fingers 18 of the blanks, as previously described.

At a final station, two pairs of laterally spaced punches (not shown) are mounted on the head of the press, and vertically aligned coacting dies (not shown) are mounted in the die block 60 for completing the blanking out of the articles by removing the stock of the connecting webs between successive articles so as to sever them from the strip S as finished articles conforming, in the illustrated example, to the switching bar of FIG. 16A.

The last described apparatus details and blanking and bending operations that follow the finish forming of the bar blank bearings at the fifth station will be sufficiently understood from the description of the preceding operations and from the description of the method as carried out in the apparatus of FIGS. 7–15. Accordingly, inclusion in FIG. 17 of those apparatus details has been deemed unnecessary.

In carrying out the method of the invention as described above with reference to FIG. 17, endwise restraint of the blanks during the two bearing forming steps (as achieved by the back-up plates 28 and 29 in the first described apparatus) is achieved in the die block 60 by the channel sides 61, the set of plier-like dies 23 and 24 that preform end bearings at the location 16a on the blanks being reduced in width so that the end of the bearing stock and the corresponding sides of these dies are in close engagement with the adjacent channel side 61. Similarly, the corresponding finish forming dies 51 and 52 are reduced in width for the same purpose.

By blanking out substantially only the bar blank zones 16a and 17a prior to preforming and finish forming the bearings in those locations, the nest plates 25 and 26 in the apparatus of FIGS. 7–14 may also be omitted. The restraining functions of those nest plates and the lateral restraining function of the back-up plate 28 are performed by the stock of the strip S itself, which remains intact in the areas corresponding to the locations of the omitted restraining plates. The resistance to lateral deformation of the incompletely defined blanks provided by the stock of the strip S is enhanced by the clamping pressure of a conventional stripper plate (not shown) carried by the head of the press in the manner of the stripper plates 47 (FIGS. 8, 11, and 15) previously described. As will be appreciated by those skilled in the metal stamping and forming arts, the sufficiency of this lateral restraint of the incompletely defined bar blanks during the bearing preforming and finish forming operations may be sufficiently achieved and, at most, reduced only in degree if some additional portions of the blanks were to be blanked out ahead of the bearing preforming and finish forming stations, so long as appreciable widths of metal of the strip S are left intact at locations adjacent the end bearing forming zone 16a and adjacent both sides of the other bearing forming zone 17a of the blank.

By way of summary, the last described method of manufacturing articles from a metal strip S in a progressive blanking and forming die assembly is basically the same as the method carried out in the apparatus of FIGS. 7-15. Prior to the bearing forming operations, at least that part of an article blank that is to be formed into a bearing is blanked out from the sheet. Thereupon, the bearing surface or surfaces are formed by cold forging or coining while confining the metal being forged against extrusion in the direction of the axis of the bearing or bearings, as well as confining the metal against extrusion in other directions by confining it in the forging die cavities. As a result, the metal of the bearing portions is both work hardened and finish formed without disturbing adjacent metal of the blank. During the bearing forging operations, the remainder of the blank, whether yet defined or not, is laterally restrained at opposite sides either by appropriate nest plates or by unremoved metal stock of the sheet itself, the metal of the blank also being restrained in both cases against upward bowing by the pressure of the conventional stripper plate. After forming the bearing or bearings, any unblanked remainder of the article is blanked out and the finger-like appendages are bent to finished form and orientation relative to the body portion of the blank, these last two steps being performed in any desired order.

From all of the foregoing disclosure, it will be appreciated that the various objects of the invention are accomplished thereby in a highly effective manner. While the invention has been illustrated with reference to details of a specific method and specific articles produced thereby, the applicability of the method to the formation of articles of different configurations and which involve similar fabricating problems will be sufficiently evident from the examples illustrated and described herein. It will be apparent to those skilled in the art that various changes may be made in the method and in the apparatus as disclosed herein, while utilizing the principles of the invention. Therefore, it is intended that the invention include all variations of the specific method and articles disclosed which are within the proper scope and meaning of the appended claims.

What is claimed is:

1. A switch actuating bar comprising a long, slim, main body portion, a plurality of fingers of rectangular transverse cross section that are integral with said body portion and project from points spaced along the length thereof in directions perpendicular to the longitudinal axis of the body portion and in different generally radial directions relative to said axis, a plurality of relatively short, cylindrical, bearing portions integral with said body portion and spaced apart along the length thereof, the remainder of said body portion being of substantially uniform rectangular cross section, and the metal of said bearing portions being in a work hardened condition providing a substantially harder surface thereon than the surface of the remainder of said article.

2. A switch actuating bar comprising a long, slim, main body portion, a plurality of fingers of rectangular transverse cross section that are integral with said body portion and project from points spaced along the length thereof in directions generally perpendicular to the longitudinal axis of the body portion and in different generally radial directions relative to said axis, a plurality of relatively short, cylindrical and coaxially aligned, bearing portions integral with said body portion and spaced apart along the length thereof, the remainder of said body portion being of substantially uniform rectangular cross section, and the surfaces of said bearing portions being substantially harder than the surface of the remainder of said article.

3. A switch actuating bar comprising a long, slim, main body portion, a plurality of fingers of rectangular transverse cross section that are integral with said body portion and project from points spaced along the length thereof in and along planes perpendicular to the longitudinal axis of the body portion and in different generally radial directions relative to said axis, a plurality of relatively short, cylindrical, bearing portions integral and coaxial with said body portion and spaced apart along the length thereof, the remainder of said body portion being of substantially uniform rectangular cross section, and the metal of said bearing portions being in a work hardened condition providing a substantially harder surface thereon than the surface of the remainder of said article.

4. A switching bar formed of malleable metal and comprising:
 (a) a longitudinally-extending body portion,
 (b) fingers integral with said body portion and projecting from points spaced along the length thereof, and
 (c) a plurality of bearing portions also integral with said body portion, said bearing portions having a generally rounded form to accommodate a relative bearing movement thereabout, and being of a hardness greater than the metal of the remainder of the switching bar to withstand such bearing movement over an extended period of time.

5. A switching bar for a pushbutton telephone or the like composed of malleable sheet metal stock, comprising:
 (a) a longitudinally-extending body portion having a uniform, relatively low hardness,
 (b) finger-like appendages integral with said body portion and projecting from points spaced along the length thereof in directions generally perpendicular to a longitudinal axis of the body portion, at least one appendage extending out of a coplanar relationship with respect to said body portion to a different radial position relative to said longitudinal axis, and
 (c) a plurality of bearing portions also integral with said body portion and spaced along the length thereof having a generally cylindrical form to accommodate a relative bearing movement thereabout, said bearing portions being of a hardness substantially greater than the metal of said body portion to withstand such relative bearing movement over an extended period of time.

References Cited by the Examiner
UNITED STATES PATENTS

| | | | |
|---|---|---|---|
| 2,395,269 | 2/46 | Hansen et al. | 179—90 |
| 2,694,759 | 11/54 | Thumim | 200—166 |
| 2,932,880 | 4/60 | Gellatly et al. | 29—155.55 |
| 2,937,434 | 5/60 | Swift | 29—155.55 |
| 3,106,628 | 10/63 | Chiswell | 200—166 |

KATHLEEN H. CLAFFY, *Primary Examiner.*

BERNARD A. GILHEANY, *Examiner.*